United States Patent [19]
Thompson

[11] Patent Number: 6,159,090
[45] Date of Patent: Dec. 12, 2000

[54] MEAT TENDERIZING SYSTEM

[76] Inventor: Michael W. Thompson, 1220 Freddie Ct., Reno, Nev. 89503

[21] Appl. No.: 09/456,018

[22] Filed: Dec. 3, 1999

Related U.S. Application Data

[63] Continuation-in-part of application No. 09/110,105, Jul. 1, 1998, abandoned.

[51] Int. Cl.⁷ .............................. A22C 21/00; A22C 9/00
[52] U.S. Cl. ......................... 452/143; 452/141; 452/145
[58] Field of Search ..................... 452/141, 145, 452/143; D7/682, 382

[56] References Cited

U.S. PATENT DOCUMENTS

| | | | |
|---|---|---|---|
| 65,878 | 6/1867 | Cover | 452/143 |
| 198,974 | 1/1878 | Fuller | 452/143 |
| D. 252,126 | 6/1979 | Durant | D7/683 |
| 311,901 | 2/1885 | Kesner | 452/143 |
| D. 365,971 | 1/1996 | Brockman | D7/682 |
| D. 395,806 | 7/1998 | Fischer | D7/694 |
| 454,330 | 6/1891 | Cady | 452/143 |
| 824,319 | 6/1906 | Tolen et al. | 452/143 |
| 894,872 | 8/1908 | Armstrong | 452/143 |
| 1,970,991 | 8/1934 | Watkins | 452/143 |
| 2,492,997 | 1/1950 | Herceg | 452/143 |
| 4,230,066 | 10/1980 | Lents | 118/20 |
| 4,380,850 | 4/1983 | Coburn | 452/145 |
| 5,084,286 | 1/1992 | Moody | 426/281 |
| 5,363,751 | 11/1994 | Prestigiacomo | 99/444 |

*Primary Examiner*—Peter M. Poon
*Assistant Examiner*—Fredrick T. French, III
*Attorney, Agent, or Firm*—Skinner, Sutton, Watson & Rounds; Adrienne Yeung; Michael A. Shimokaji

[57] ABSTRACT

This invention relates to food preparation; in particular this invention relates to an apparatus used to prepare meats and poultry; and more particularly this invention relates to an apparatus and method to tenderize meats and poultry products.

23 Claims, 3 Drawing Sheets

MEAT TENDERIZING SYSTEM

This application is a continuation-in-part of U.S. patent application No. 09/110,105, filed Jul. 1, 1998, abandoned Dec. 3, 1999.

BACKGROUND OF THE INVENTION

1. Field of the Invention

This invention relates to food preparation; in particular this invention relates to an apparatus used to prepare meats and poultry; and more particularly this invention relates to an apparatus and method to tenderize meats and poultry products.

2. State of the Art

People slaughter animals to produce meat and eat the meat. The meat may be tender or tough depending on the species of the animal slaughtered, its breed, its health, its feed, the amount of exercise it got, whether it was fed at a feed lot before slaughter, and a variety of other factors. People tend to prefer tender meat because it is easier to eat, easier to digest, and tends to be more flavorful. Consequently, a variety of methods have been developed over the years to tenderize meat and make it more palatable for human consumption.

Pounding meat with hammers and the like are the most common means of tenderizing meat. Steaks, chops, and similar flat pieces of meat are prepared by striking them forcefully with a hammer or other blunt object. Meats prepared this way need to use a specific technique, or the meat may be unevenly tenderized. Meats prepared this way, as are shellfish (for example, abalone) and other types of fish and poultry are not only tenderized, but also thinned and sometimes the piece of meat is pierced or otherwise rendered less usable by pounding.

Other methods of tenderizing meat include marinating, aging, and the like, but these methods all require extra time to be fully effective and can change the texture and flavor of the meat being treated.

Therefore, there is a need for a method and apparatus of tenderizing meats that is safer than a hammer, provides for a quick and efficient tenderization-of the meats such that it will not shred or otherwise harm the meat rendering it useless, and allows for a more sanitary way to tenderize meats.

SUMMARY OF THE INVENTION

This invention provides a method and apparatus to tenderize meat. The meat tenderizer includes a meat receiving platform and a meat tenderizing roller.

A first aspect of this invention provides an apparatus for tenderizing meat comprising:

a meat receiving platform having means to secure the meat against lateral movement and means to retain liquids; and a meat tenderizing hand roller having a roller member and a shaft member, the meat tenderizing roller member having a plurality of extensions for contacting the meat, and the shaft member having means to allow the user of the apparatus to manipulate the roller.

A second aspect of this invention provides for:

a roller member having a hollow body defining an aperture; the roller member having a plurality of extensions extending outwardly from the roller member;

a shaft member having a first side and a second side; the shaft member slidably engaged in the hollow body; and a support means located substantially between the first side and the second side of the shaft member.

In another aspect, this invention provides a method for tenderizing meat comprising:

securing a first side of a piece of meat on a meat receiving platfomr in such a manner to allow the second side of the piece of meat to lay flat to be contacted, said meat receiving platform having means to secure the piece of meat and means to retain liquids;

contacting the second side of the secured piece of meat with a rolling device having a plurality of meat tenderizing protrusions, removing the rolling device from the meat; and removing the meat from the meat receiving platform.

DETAILED DESCRIPTION OF THE PREFERRED EMBODIMENT

Figure 1:
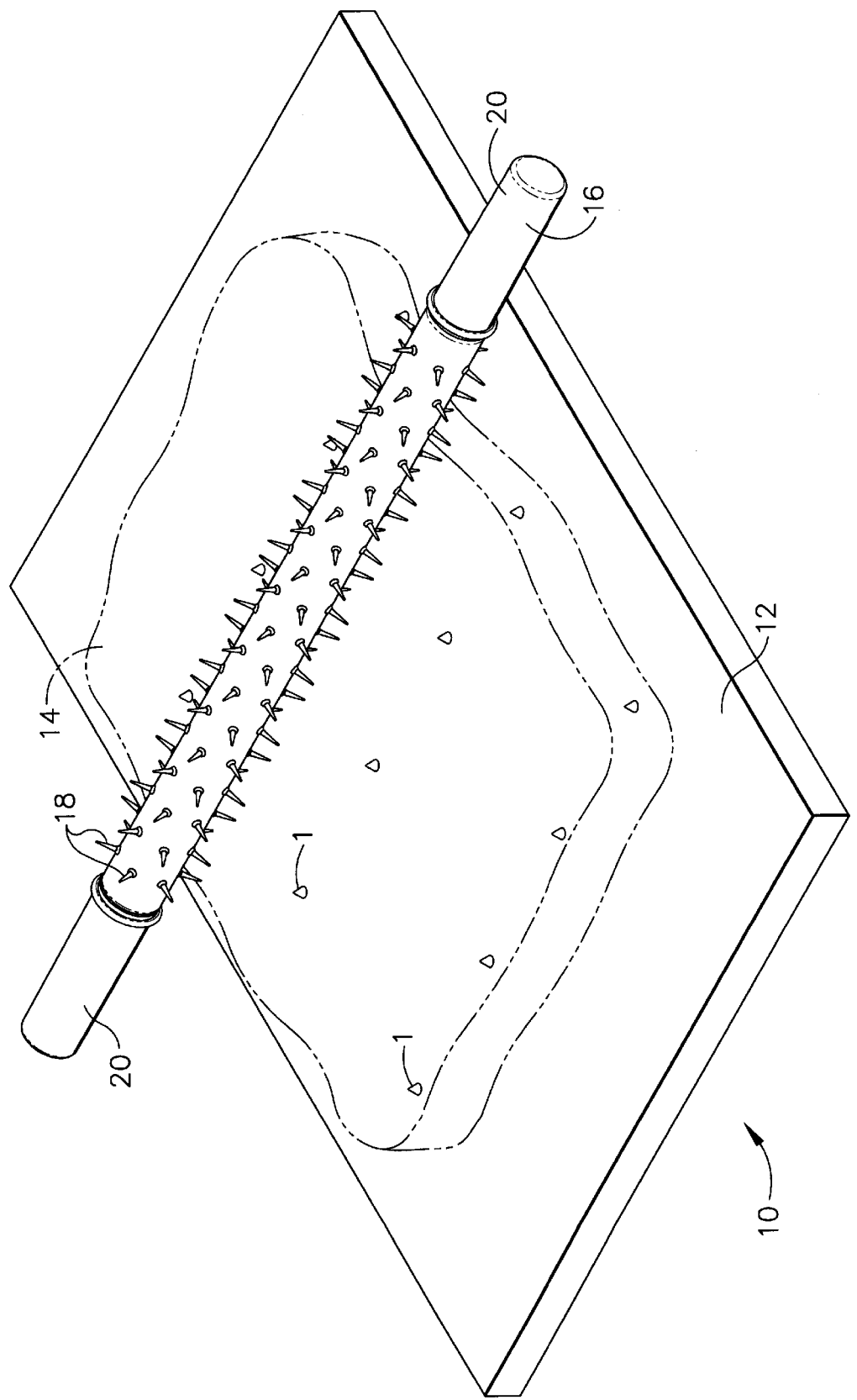
FIG. 1 is a perspective view of the preferred embodiment of the present invention.

Referring to FIG. 1, a meat tenderizing apparatus 10 has two primary subassemblies. The first subassembly is a meat receiving platform 12. In a first embodiment, the meat receiving platform is a flat surface that can be positioned for easy use by a user, typically by placing the surface on a horizontal surface such a table top or a counter top. The meat receiving platform has means to secure a piece of meat 14 (shown here in phantom) against lateral movement once the meat to be processed is laid on the surface of the meat receiving platform. One preferred means of securing the meat on the meat receiving platform is placing the meat on a plurality of extensions 1 or protrusions formed in the top surface of the meat receiving platform to contact the piece of meat laid thereon.

Figure 4:
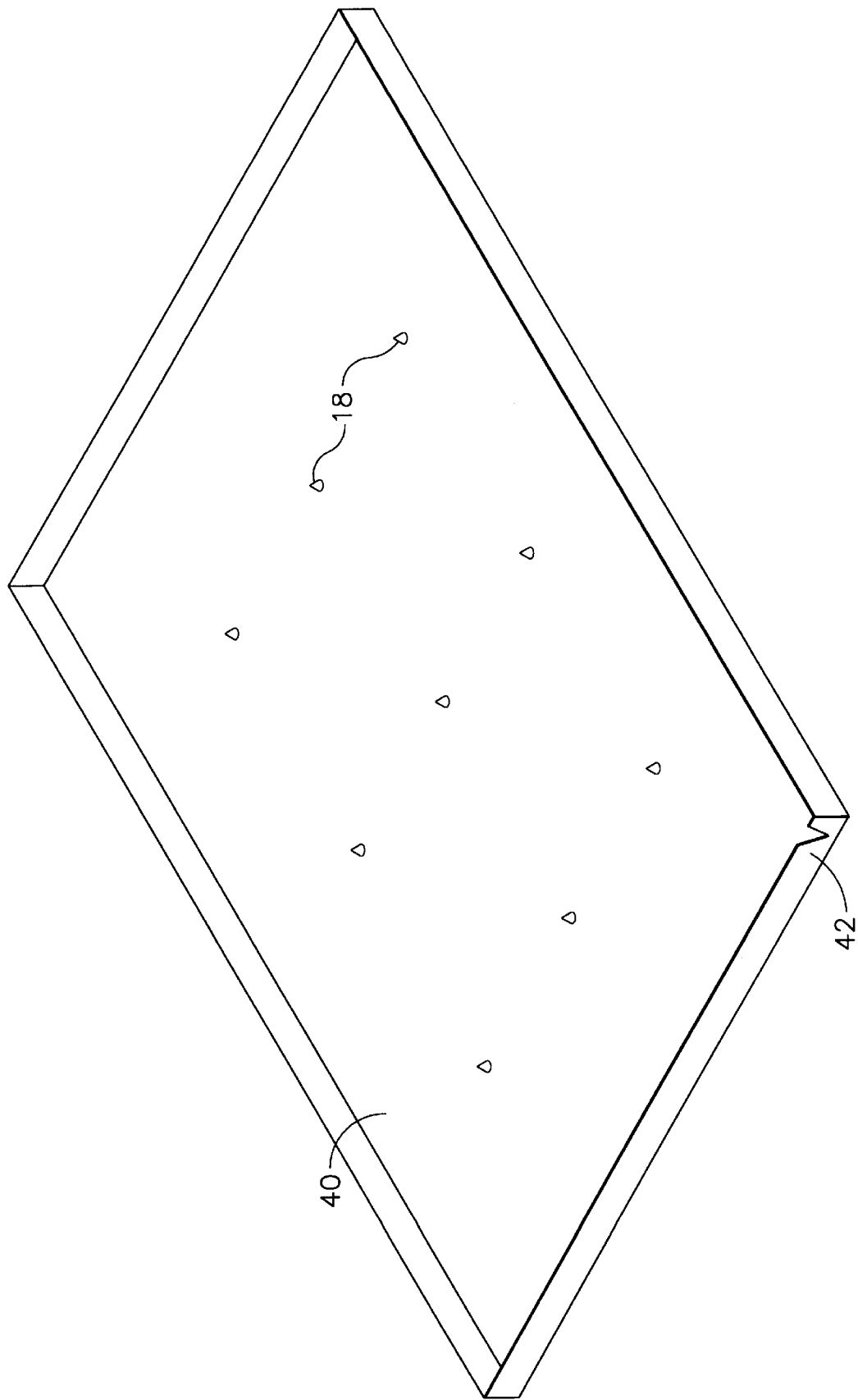
FIG. 4 is a perspective view of a second embodiment of the present invention.

In a second embodiment, as shown in FIG. 4, the meat receiving platform may also have a reservoir 40 to hold the meat and marinating juices. This will facilitate quick marination of the meat all the while providing for a sanitary way to tenderize meats by preventing the juices from leaking onto the kitchen counter or floor. Furthermore, a user can place the meat receiving platform in the refrigerator with both the meat and marinating juices to further enhance the taste of the meat. Additionally, the reservoir may also have a spout 42 to facilitate the quick and easy cleaning of the meat receiving platform.

The piece of meat 14 may be the typical meats such as a steak or chop, but may also be other pieces of meat such as seafood. The meat will have a first side and a second side. For convenience in the following discussion, the first side will hereinafter be defined as the side of the piece of meat contacting the protrusions on the meat tenderizing platform. The second side will be the side that the roller contacts. Only if the piece of meat is turned over to present the first side to the roller, which is in fact the preferred method of operation, but not a required method of operation, will the first side be independently tenderized. While it is not impossible to tenderize chunks of meat, such as roasts or, for example, a butterflied leg of lamb, using the meat tenderizing platform and roller of this invention, the meat will be substantially flatter after the application of this invention then it was at the start of the process. In the example of the butterflied leg of lamb, the resulting piece of post process meat might be nearly as flat as a steak or chop, and may be cooked in a way compatible with a steak.

The receiving platform 12 may be made from any selection of conventional materials including plastic, wood, metal and the like. All that the material of the receiving platform must do is present a flat surface that has some degree of resistance to warpage and has enough toughness to withstand the pressure that may be brought to bear when the meat is tenderized in the operation of the process of this invention. The most preferred material to make the platform from is any plastic or organic polymeric composition that presents a hard surface for the operation of the process of this invention. Hard surface plastic is particularly preferred because it is easy to clean after the tenderizing operation and prevents dulling of knives that may be used to trim or otherwise process the meat further in conjunction with the tenderizing process.

The extensions 1, protrusions, or upwardly extending members will preferably be between about one eighth inch and one half inch in length, more preferably they will be between about one eighth inch and one quarter inch in length. The length of these members is chosen primarily by balancing the competing demands of wanting a perfectly flat surface and wanting large sharp extensions that firmly and positively engage the meat on the receiving platform.

The second subassembly is the meat tenderizing roller 16. The roller has a plurality of protrusions or extensions 18 extending therefrom. The protrusions are preferably about twice to five times the height of the protrusions on the meat receiving platform. The purpose of these extensions are not to merely engage the meat, but instead to essentially 'poke' the meat, tenderizing it by extreme application of localized force. They are longer than the extensions on the platform because the 'poking' process is preferably felt through the entire thickness of the meat. Preferably, the length of the extensions are between about one half inch and about two inches in length; more preferably they are between about one inch and one and one half inches in length. It is preferred that all the extensions be about the same length so that the user can easily contact all the extensions with the piece of meat as he passes the roller over the meat.

In a preferred embodiment, the roller 16 has handles 20 mounted on the ends to allow facile grasping of the ends of the roller member by the butcher or chef. The user, the butcher or chef, grabs one end of the roller in each hand and bears the roller down on the secured piece of meat by leaning forward and downwardly. In this preferred type of embodiment, the roller has two primary elements, a rolling member that has the protrusions on its surface and the non-rotating axle or shaft member passing through a middle aperture defined by the rolling member. The handles are constructed with hilts contacting the roller member to preserve the relative locations of the roller member and the non-rotating axle member.

Figure 2:
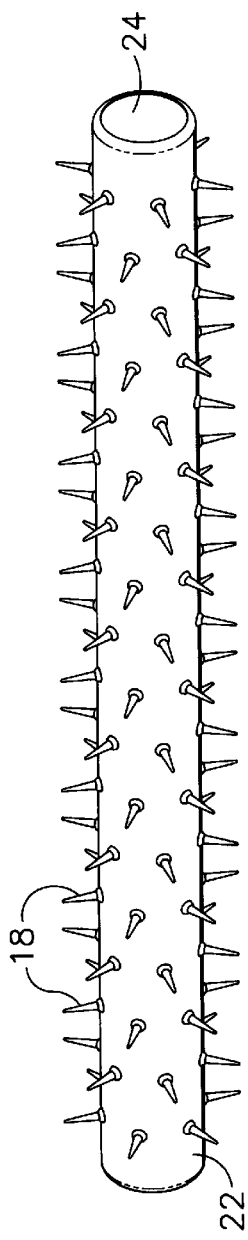
FIG. 2 is a perspective view of the rotating member of the roller of the embodiment of FIG. 1.

Referring now to FIG. 2, the roller member 22 of the roller has a hollow body member defining an aperture 24. The outer surface of the roller has a plurality of extension members 18 arrayed on its surface. The extension members are all of uniform height and are equally spaced. Any equally spaced protrusions are acceptable. The primary consideration for the pattern of the protrusions is that the roller roll smoothly and freely over the piece of meat. The meat processed by contacting the roller then has a uniform pattern of tenderizing contact points made by the roller. The roller preferably passes over the meat several times until the meat is throughly tenderized and is then flipped over so that the other side of the meat can be contacted by the roller.

Figure 3:
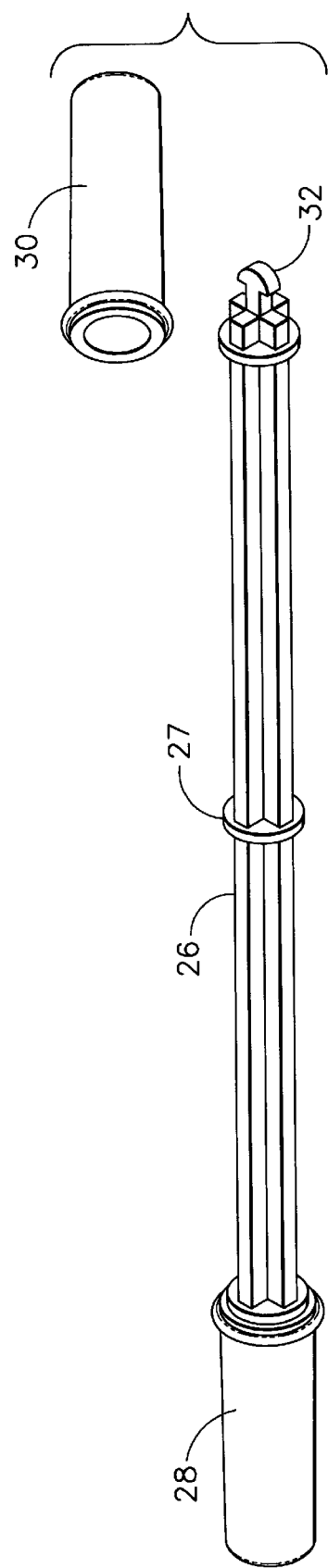
FIG. 3 is a perspective view of the stationary member of the roller of the embodiment of FIG. 1.

Referring now to FIG. 3, the roller member is mounted on a shaft member 26 that passes through an aperture 24 defined in the roller member 22. The shaft member has a first handle 28 mounted on a first end of the handle member and a second, preferably removable, handle 30 mounted on the second end 32 of the shaft member 26. (The second handle is shown in the removed mode in the Fig.) Of course, if preferred, both the first handle and the second handle could both be removable from the shaft for ease of cleaning or for ease of manufacture of the roller. The shaft is preferably made from high impact plastic, although the shaft may be made from other materials for example, metal, including aluminum, iron or stainless steel, or similar materials. The shaft member or non-rotating axle 26 may have support members 27 located between the first side and the second side as in the manner shown in FIG. 3. The support members 27 strengthen the non-rotating axle 26 and support the hollow body of the roller member 22 of the hand roller 16. The most important property for the shaft to have is that it not break or deform under fairly substantial pressure that might be placed on it as the meat is tenderized. In the actual operation of this invention, it may be found that certain operations, for example those in commercial kitchens and the like, require the use of heavier duty materials than the materials that might suffice for home use.

This invention also provides a method for tenderizing meat. First, the meat is secured on the meat receiving platform by placing it thereon. As noted above, in the preferred embodiment, the extensions from the platform contact the meat and prevent movement of the meat. Moreover, in another preferred embodiment, the meat may be placed in a reservoir which is able to contain both the meat and marinating juices to facilitate the tenderizing of the meat.

The user, usually a butcher, chef or homemaker, passes the meat roller over the secured meat. Preferably, it is rolled over at least once, and more preferably it is rolled over the meat enough times to completely tenderize the meat. The user may use considerable force to increase the pressure of the points of the roller on the meat. The force may be varied because of the thickness of the piece of meat or because of the toughness of the piece of meat. The desired use of the meat, which may dictate a thicker or a thinner piece of meat for the final use, may also dictate forcing the roller with more or less pressure. The piece of meat may be flipped over and replaced on the receiving platform and the process repeated to allow tenderizing of the opposite side of the meat as well. The same considerations about the force administered to the first processed piece of meat (the second side as defined herein) and so forth all apply to the second side operated one (the first side as defined herein). Finally, the roller is removed from the meat by the user, and the piece of meat is removed from the platform.

Only if the piece of meat is turned over to present the first side to the roller, which is in fact the preferred method of operation, but not the required method of operation, will the first side be independently tenderized. It is possible for the user to tenderize chunks of meat, for example roasts or, as another example, a butterflied leg of lamb, using the meat tenderizing platform and roller of this invention. Such a chunk of meat may be flatter after the application of this invention than it was at the start of the process.

In a preferred embodiment, the shaft has handles mounted on the ends to allow facile grasping of the ends of the roller member by the butcher or chef. The user, the butcher or chef, grabs one end of the roller in each hand and bears the roller down on the secured piece of meat by leaning forwardly and downwardly. The meat may be processed for a long time or for a short time based on the best judgement of the user. Parts of the piece of meat may require more processing than others, and the user again must judge what he or she thinks is best for the particular piece of meat.

Applicant described this invention by reference to specific embodiments and examples of the invention. Those skilled in the art can readily modify, vary, or alter the invention so described and exemplified without violating the spirit and intent of the invention. Consequently, the appended claims encompass all such variations, modifications, and alterations of the invention.

I claim:

1. An apparatus for tenderizing meat comprising:
    a roller member having a hollow body defining an aperture; the roller member having a plurality of extensions extending outwardly from the roller member;
    a shaft member having a first side and a second side; the shaft member slidably engaged in the hollow body; and
    a support means located substantially between the first side and the second side of the shaft member.

2. The apparatus of claim 1 wherein the plurality of extensions are between about one eighth inch and one half inch in length.

3. The apparatus of clam 1 wherein the plurality of extensions are between one eighth inch and one quarter inch in length.

4. The apparatus of claim 1 wherein the shaft member further comprises a first handle on the first side and a second handle on the second side.

5. The apparatus of claim 4 wherein the first handle and the second handle are removable from the shaft member.

6. An apparatus for tenderizing meat comprising:
    a meat receiving platform having means to secure the meat against lateral movement and means to retain liquids; and
    a meat tenderizing hand roller having a roller member and a shaft member, the meat tenderizing roller member having a plurality of extensions for contacting the meat, and the shaft member having means to allow the user of the apparatus to manipulate the roller;
    wherein the roller member of the roller is removable from the shaft member and wherein the shaft member has a support means located between a first side and a second side of the shaft member.

7. The apparatus of claim 1 wherein the shaft member includes two handles extending outwardly.

8. The apparatus of claim 7 wherein at least one of the handles extending outwardly is removable.

9. The apparatus of claim 1 wherein the meat receiving platform has a plurality of meat engaging and securing extensions extending upwardly therefrom.

10. The apparatus of claim 9 wherein the extensions are between about one eighth inch and one half inch in length.

11. The apparatus of claim 10 wherein the extensions are between one eighth inch and one quarter inch in length.

12. The apparatus of claim 1 wherein the roller member extensions are between about one half inch and about and two inches in length.

13. The apparatus of claim 1 wherein the roller member extensions are between about one inch and one and one half inches in length.

14. The apparatus of claim 1 wherein the means to retain liquids comprises a reservoir within the meat receiving platform.

15. The apparatus of claim 1 wherein the means to retain liquids further comprises a spout.

16. An apparatus for tenderizing meat comprising:
    a meat receiving platform having a plurality of protrusions to secure the meat against lateral movement and a reservoir to retain liquids; and
    a meat tenderizing hand roller having a roller member and a shaft member, the meat tenderizing roller member having a plurality of extensions for contacting the meat, the height of the extensions being twice to five times the height of the protrusions on the meat receiving platform, and the shaft member having two handles to allow the user of the apparatus to manipulate the roller.

17. A method for tenderizing meat comprising:
    securing a first side of a piece of meat on a meat receiving platform in such a manner to allow the second side of the piece of meat to lay flat to be contacted, the meat receiving platform having plurality of protrusions extending outwardly to secure the piece of meat and means to retain liquids, wherein the plurality of protrusions prevents lateral movement of the piece of meat;
    contacting the second side of the secured piece of meat with a rolling device having a plurality of meat tenderizing extensions, the height of the extensions being twice to five times the height of the protrusions on the meat receiving platform;
    removing the rolling device from the meat; and
    removing the meat from the meat receiving platform.

18. The method of claim 17 further including the step of, after the meat has been secured to the platform, the piece of meat is contacted by a roller member held by a user.

19. The method of claim 17 wherein the user passes the rolling device over the meat at least once.

20. The method of claim 17 including the step of repeatedly contacting the piece of meat with the rolling device by passing it over the piece of meat several times.

21. The method of claim 17 further including the step of contacting the meat hard enough and frequently enough by the roller device to assure that the surface of the meat is broken by the extensions on the roller member.

22. The method of claim 17 further including the steps of removing the meat from the platform;
    turning it over;
    replacing it on the receiving platform; and
    allowing the rolling device to contact and tenderize the first side of the piece of meat.

23. The method of claim 17 further including the step of the user holding the rolling device by handles extending out from the end of the rolling device and pressing forwardly and downwardly.

* * * * *